(12) United States Patent
McPhail

(10) Patent No.: US 6,621,008 B1
(45) Date of Patent: Sep. 16, 2003

(54) INSULATIVE SUPPORT WEDGE

(76) Inventor: Bryan McPhail, 16410 E. Courtney Atherton Rd., Independence, MO (US) 64058

( * ) Notice: Subject to any disclaimer, the term of this patent is extended or adjusted under 35 U.S.C. 154(b) by 0 days.

(21) Appl. No.: 10/299,081

(22) Filed: Nov. 19, 2002

(51) Int. Cl.$^7$ .............................. H01B 7/00; E02D 5/80
(52) U.S. Cl. ...................... 174/135; 52/165; 248/523; 256/19; 403/315; 403/338
(58) Field of Search .................. 174/138 D, 138 E, 174/135; 52/153, 165; 248/523; 256/19, 59, 65, 70; 403/315–317, 335, 338, 373, 374.3

(56) References Cited

U.S. PATENT DOCUMENTS

| | | | | |
|---|---|---|---|---|
| 1,435,092 A | * | 11/1922 | Thomas ....................... 403/107 |
| RE26,779 E | | 2/1970 | Weichenrieder .............. 116/63 |
| 3,740,024 A | * | 6/1973 | Hellerich et al. ............. 256/51 |
| 5,022,618 A | | 6/1991 | Barrett et al. ................ 248/146 |
| 5,165,663 A | * | 11/1992 | Wells ........................... 256/19 |
| 5,755,431 A | | 5/1998 | Williams ....................... 256/19 |
| 6,135,670 A | * | 10/2000 | Bahnman et al. ............ 403/373 |
| 6,283,670 B1 | * | 9/2001 | Blankinship et al. ........ 403/313 |
| 6,461,084 B1 | * | 10/2002 | Stuart .......................... 405/244 |
| 6,494,643 B1 | * | 12/2002 | Thurner ....................... 405/244 |

* cited by examiner

Primary Examiner—Dean A. Reichard
Assistant Examiner—Adolfo Nino
(74) Attorney, Agent, or Firm—Christopher J. Whewell

(57) ABSTRACT

Provided herein is an article which is by its nature readily clamped to the end portion of a metallic ware employed as a cable support rack, and driven into the ground. An insulative wedge according to the invention renders a linear metallic ware to not be in contact with the ground, and has the further advantage of comprising an end portion which penetrates earth readily but which is simultaneously deflected by subterranean conduits into which it may inadvertently come into contact with, thereby not interfering with the integrity of subterranean utilities, including wires, pipes, conduits, and the like.

15 Claims, 12 Drawing Sheets

INSULATIVE SUPPORT WEDGE

TECHNICAL FIELD

This invention relates to an article useful for insulating metallic objects from ground contact. More specifically, it relates to an insulative wedge or shoe that is adapted to be attached to the end of a portion of a metallic frame or rail to enable the support of the metallic frame or rail in the earth in a state in which the frame or rail is electrically insulated from ground contact.

BACKGROUND

The development of pristine real estate and the maintenance of developed real estate often entails work by craftsman in several of the known trades, such as electricians, plumbers, linesmen, cable television installers, telephone installers, sewer lines, and natural gas lines, in addition to operators of heavy earthmoving equipment. It is commonplace for various conduits to be located in a subterranean environment, such as in the cases of buried pipes and wires.

A cable rack is a structural support framework which may exist in any configuration desired by the user. Cable racks are used to support cables and wires in a location which maintains their functionality while at the same time supporting them away from an area in which work, such as excavation, is carried out. To cite but one example, telecommunications companies drive steel bars directly into the ground in order to provide a vertical beam from which various wares, including cables may be hung. Such a practice is dangerous insomuch as the possibility exists that a steel bar so driven may on occasion strike an electrical supply line and pierce through its insulation, thus providing an effective electrical contact between the contents of a cable so breached and the steel bar. If a person is holding such a steel bar while it pierces such insulation, the person may become instantly in contact with an electrical potential of lethal electromotive force.

As a measure of safety, some telecommunications companies specify that a person who drives such bars into the ground must wear rubber gloves.

The prior art has addressed electrically insulating various metallic objects. For example, Re-reisve U.S. Pat. No. 26,779 discloses a street boundary post with a hollow space opening at least upwards, and having a holding arrangement for a rod-type snow sign. U.S. Pat. No. 5,022,618 provides a mailbox support apparatus comprising: a) a ground mount stake; b) a hollow post member of greater diameter than the ground mount stake, the hollow post member having a first open end and a second open end remote from and parallel to the first open end; c) spacer members detachably mountable upon the ground mount stake and sized to provide a pressure fit of the hollow post member upon the ground mount stake when the ground mount stake with the spacer members mounted thereon is longitudinally inserted into the first open end of the hollow post member; d) a mounting plate; e) a means for attaching the mounting plate to the second open end of the hollow post member; and f) a means for attaching the mounting plate to a bottom of a mailbox. U.S. Pat. No. 5,755,431 teaches a mounting fitting for securing a hollow post having an inner surface to a stake having a cross sectional configuration defining an outer surface, the mounting fitting comprising: a) a first member having an inner surface defining an aperture, in which the aperture includes a first leg and a second leg formed about a first axis and a third leg and a fourth leg formed about a second axis, and in which the first and second axes intersecting at a center, and in which the first, second, third, and fourth legs each including a terminal end remote from the center, the first member further including first sizing means for elastically deforming the inner surface and enlarging the aperture whereby the first member slidably accommodates stakes of varying sizes, the first sizing means including a slot formed in the inner surface; and b) a second member connected to the first member, the second member defining a peripheral surface adapted to be engageable with the hollow post to frictionally couple the hollow post to the mounting fitting.

However, of all the devices in the prior art, none is suitable for enabling the support of a metallic vertical beam portion of a cable rack or other framework in an insulated condition from the ground. Further, the prior art does not provide a means by which existing cable rack support framework may be rendered to have its end portion supported by the ground in an insulated condition. Further, the prior art does not provide a means by which an existing cable rack supporting framework may be conveniently pounded into the ground while being in an insulated condition with respect to the ground, which means is provided with a feature that greatly reduces or eliminates the propensity for breaching underground conduits, such as cables and pipes. However, by my invention, there is now available a device which provides the aforesaid means, as well as other advantages and features, which will become apparent to those skilled in the art after reading and understanding the contents of this specification.

SUMMARY OF THE INVENTION

The present invention provides an insulative wedge article for attachment to the ends of linear metallic wares. An article according to the invention comprises: a base portion and a clamping portion. The base portion exists substantially in the shape of a rectangular solid, and has a length dimension, a width dimension, a thickness dimension, a top surface, a bottom surface, a first end portion, and a second end portion. According to a preferred form of the invention, the top surface and the bottom surface taper towards one another in an intersecting orientation directed towards the first end portion. The second end portion of the base portion comprises a planar ledge of substantially rectangular dimensions having longest and shortest sides, wherein the length dimension of the planar ledge extends in the same direction as the length dimension of the base portion, and wherein the width dimension of the planar ledge extends in the same direction as the width dimension of the base portion. The planar ledge portion has a thickness dimension which is less than the thickness dimension of the base portion. The planar ledge comprises at least one locator block disposed thereon, and the ledge spans the entire width dimension of the base portion, and spans at least 25% of the length dimension of the wedge. The second end portion further comprises a plurality of fastener bosses disposed about the outer perimeter of the planar ledge along each of its longest sides, and the base portion further including a locator well in its top surface portion. The clamping portion exists substantially in the shape of a rectangular solid, and has a length dimension, a width dimension, a thickness dimension, a top surface, a bottom surface, a first end portion, and a second end portion. The bottom surface portion of the clamping portion includes at least one depression that is adapted to receive the at least one locator block. The first end portion of the clamping portion includes a tongue portion which protrudes lengthwise from its first end portion. The tongue portion further comprises a hook means which is adapted to connectively engage the locator well on the base portion. The clamping portion further comprises a plurality of fastener bosses disposed about the outer perimeter of each of its longest sides. The tongue portion is engaged in the locator well to provide an insulative wedge according to the invention.

DETAILED DESCRIPTION

Figure 1:
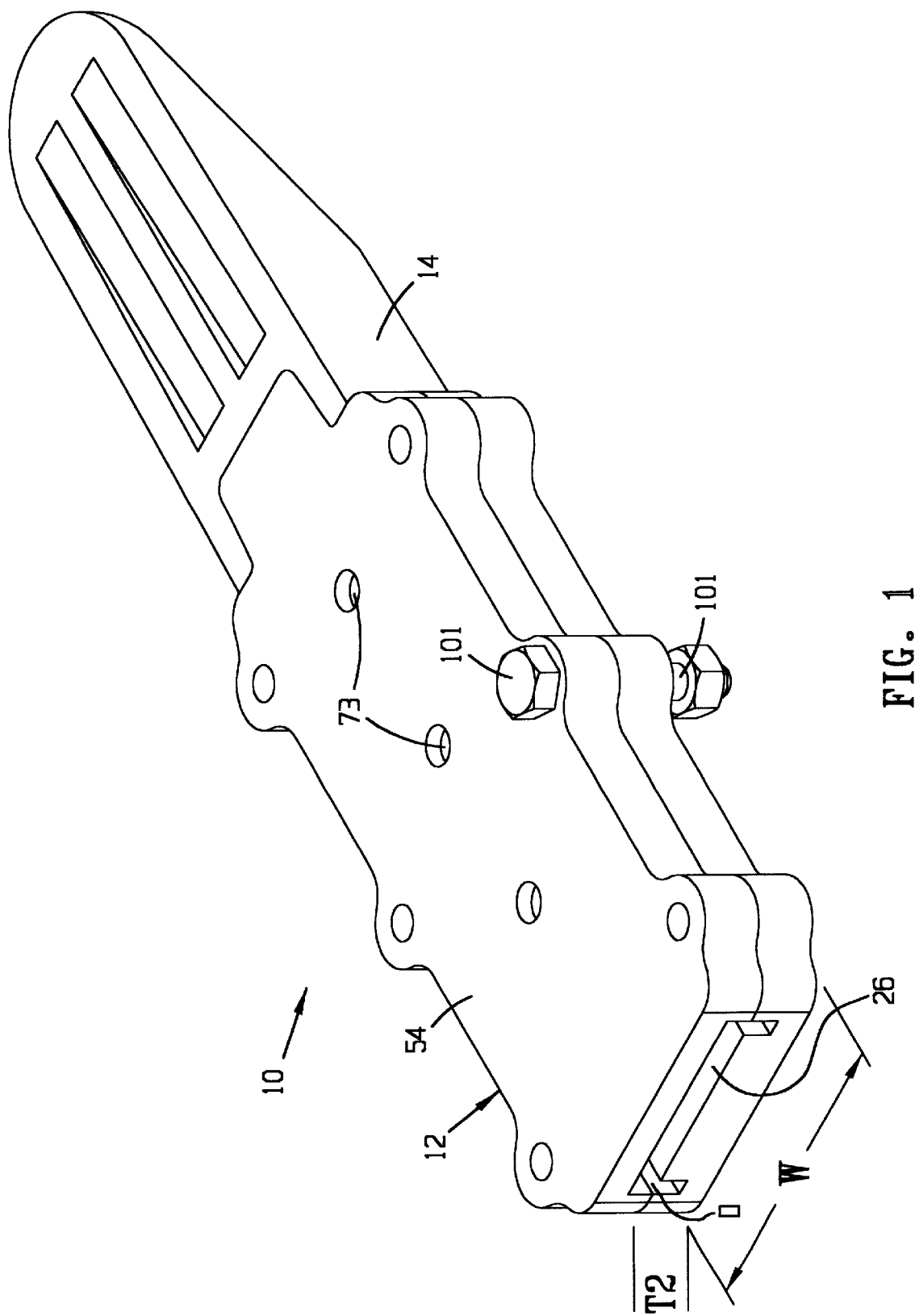
FIG. 1 is a perspective view of an assembled insulative wedge according to the invention.

Referring to the drawings, and initially to FIG. 1, there is shown a perspective view of an insulative wedge 10 according to the invention. In this figure, the insulative wedge is seen to comprise a base portion 14, and a clamping portion 12. The clamping portion has a plurality of holes 73 through its surface. The insulative wedge 10 has a width dimension denoted by W. The thickness of the planar ledge portion 26, as later described, is also shown as $T_2$.

Figure 2:
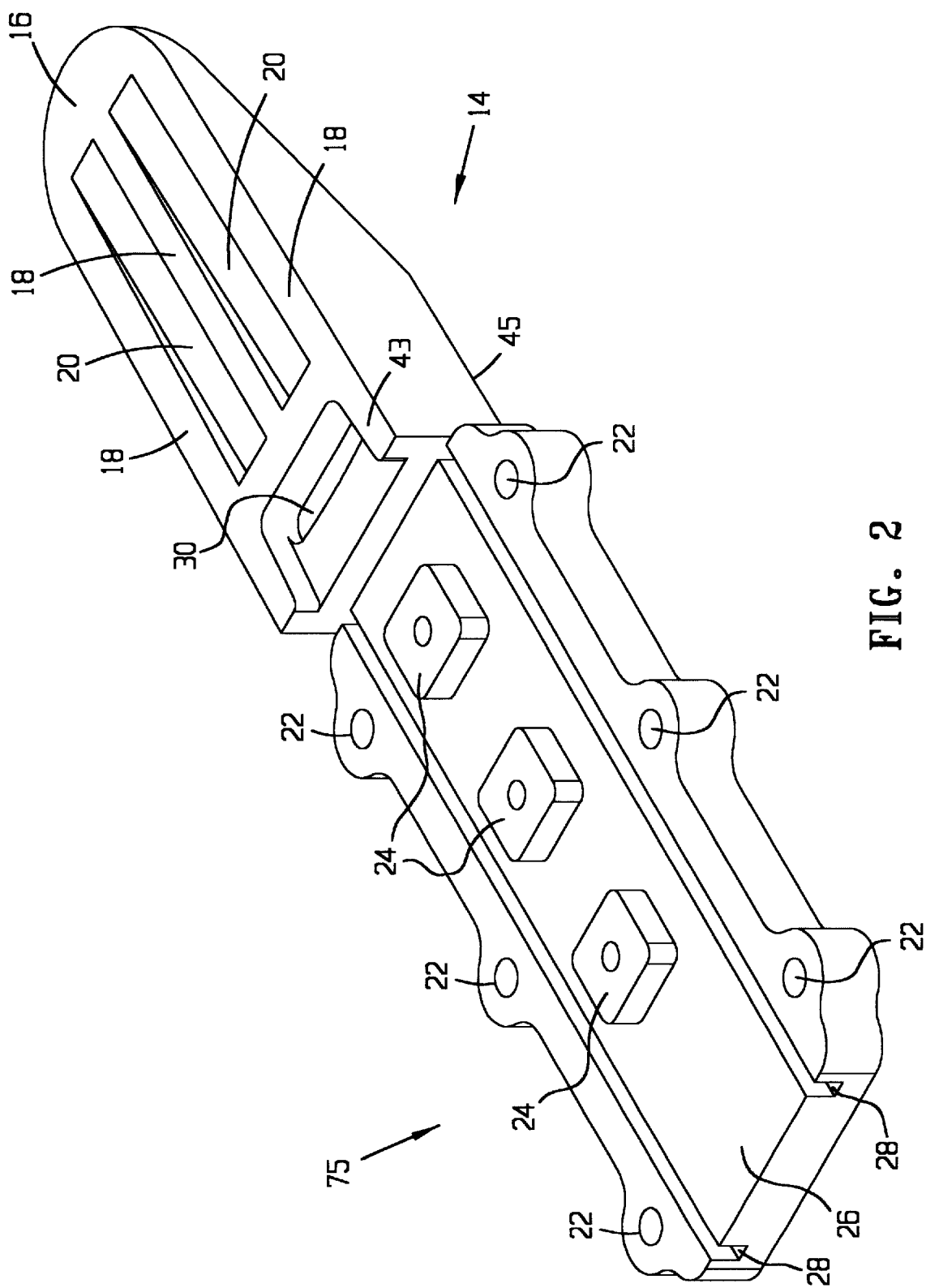
FIG. 2 is a perspective view of the base portion of an insulative wedge according to the invention.

FIG. 2 shows a perspective view of the base portion 14 of an insulative wedge according to the invention. In this figure is seen the top surface 43 and bottom surface 45 of the base portion, which taper towards one another in an intersecting orientation directed towards the first end portion 16, at which is effectively disposed a curved tip. The base portion is preferably made from an insulative material, such as polyethylene or polypropylene, and is preferably made by an injection molding process. Thus, there are strength ribs 18 disposed along the length of the top surface portion, between which are depressions 20. At the second end portion 75, there is a planar ledge 26 having substantially rectangular dimensions, with longest sides and shortest sides. The length dimension of the planar ledge portion 26 extends in the same direction as the length dimension of the base portion 14 itself, and the width dimension of the planar ledge portion 26 extends in the same direction as the width dimension of the base portion 14 itself. Disposed about the outer periphery of the planar ledge portion along the longest sides of the substantially rectangular planar ledge is a plurality of fastener bosses 22. In addition, in a preferred form of the invention, there is at least one locator block 24 disposed on the planar ledge portion. There is a locator well 30 disposed in the top surface portion 43 of the base portion 14, which is a depression that is adapted to receive a complementary mating hook means which is an element of the clamping means 12, as later set forth. According to a preferred form of the invention, the thickness $T_2$ (FIG. 1) of the planar ledge portion 26 is less than the thickness dimension of the base portion 14 as most clearly represented by $T_1$ in FIG. 3b. According to a preferred form of the invention, the planar ledge portion 26 is of uniform thickness along its length. It is preferred that the length dimension of the planar ledge portion is at least 25% of the value of the overall value of the length dimension of the base portion taken as a whole, including the length of the planar ledge portion.

Figure 3A:
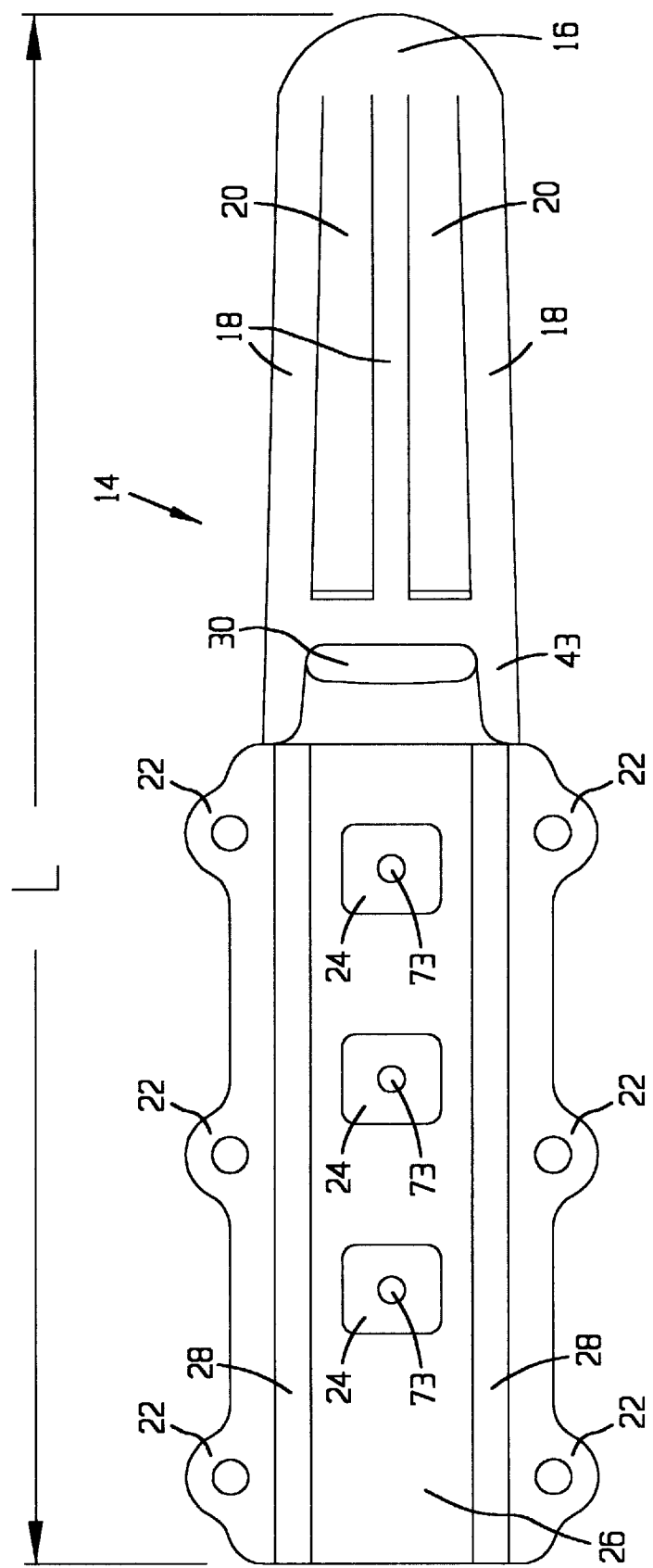
FIG. 3a is an overhead view of the base portion of an insulative wedge according to the invention.

FIG. 3a shows a top view of the base portion 14 of FIG. 2, including a representation of the overall value of the length dimension L. In this figure are shown the first end portion having curved tip 16, the strength ribs 18 and depressions 20 therebetween. The engaging well 30 is shown as a depression in the top surface 43 of the base portion 14. At the second end portion 75 of the base portion 14 is shown the planar ledge portion 26, having locator blocks 24 disposed thereon. According to a preferred form of the invention, the locator blocks have holes 73 disposed through their bodies, which holes extend through the thickness dimension $T_2$ of the planar ledge portion 26, as shown in FIG. 1. While depicted in the form of rectangular solids which protrude upwards from the surface of the planar ledge portion, the locator blocks 24 may be of any geometric form such as cylindrical solid, pyramidal solid, star-shaped solid, triangular solid, etc., provided the clamping portion 12 is provided with a complementary depression that is adapted to receive the locator blocs when the clamping portion 12 is in its normal position, as described elsewhere herein. In one preferred form of the invention, there are channels disposed in the planar ledge portion 26, which channels extend in the same direction as the length dimension of the base portion viewed as a whole. Preferably, the channels are linear, continuous, and are uniform in their depth, which may be any depth desired. The fastener bosses 22 are also shown in their preferable locations disposed about the outer periphery of the planar ledge portion along its longest sides.

Figure 3B:
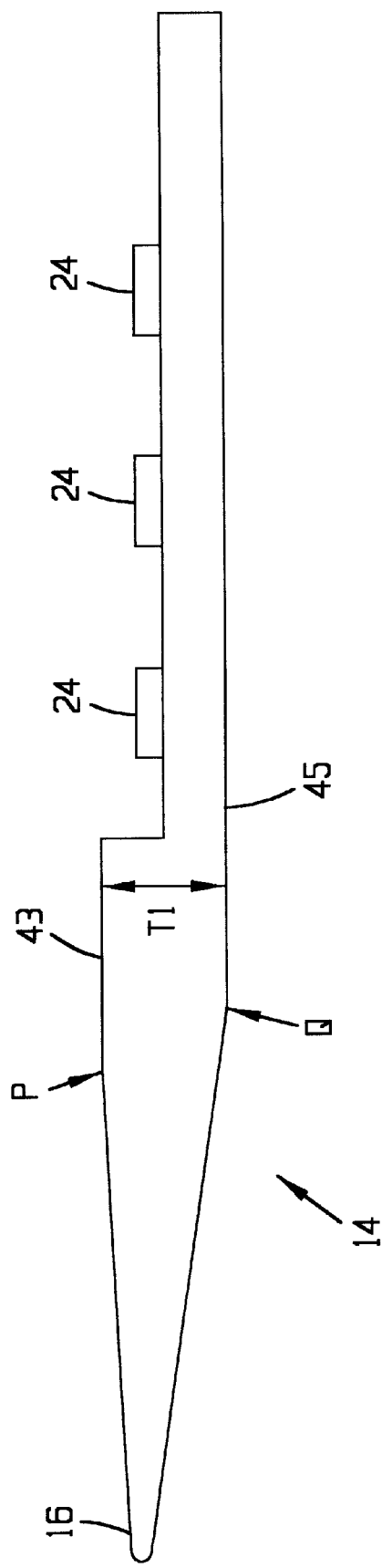
FIG. 3b is a side elevational view of the base portion of an insulative wedge according to the invention.

FIG. 3b shows a side perspective view of the base portion 14 of an insulative wedge 10 according to the invention. For the sake of clarity, depicted in this figure are the locator blocks 24, the bottom surface portion 45, top surface portion 43, and first end portion having a rounded tip at 16, and thickness $T_1$ is also shown. The top surface 43 may lie in a single plane, or may be a plurality of planes, such as when it is angled at a point P along its length, wherein the angle is any value between 160 and 180 degrees and point P may be located anywhere along the length of the top surface 43. The present invention includes the presence of a plurality of points such as point P along the length of the top surface 43. Likewise, the bottom surface 45 may lie in a single plane, or may be a plurality of planes, such as when it is angled at a point Q along its length, wherein the angle is any value between 160 and 180 degrees, and point Q may be located anywhere along the length of the bottom surface 45. The present invention includes the presence of a plurality of points such as point Q along the length of the top surface 45.

Figure 4:
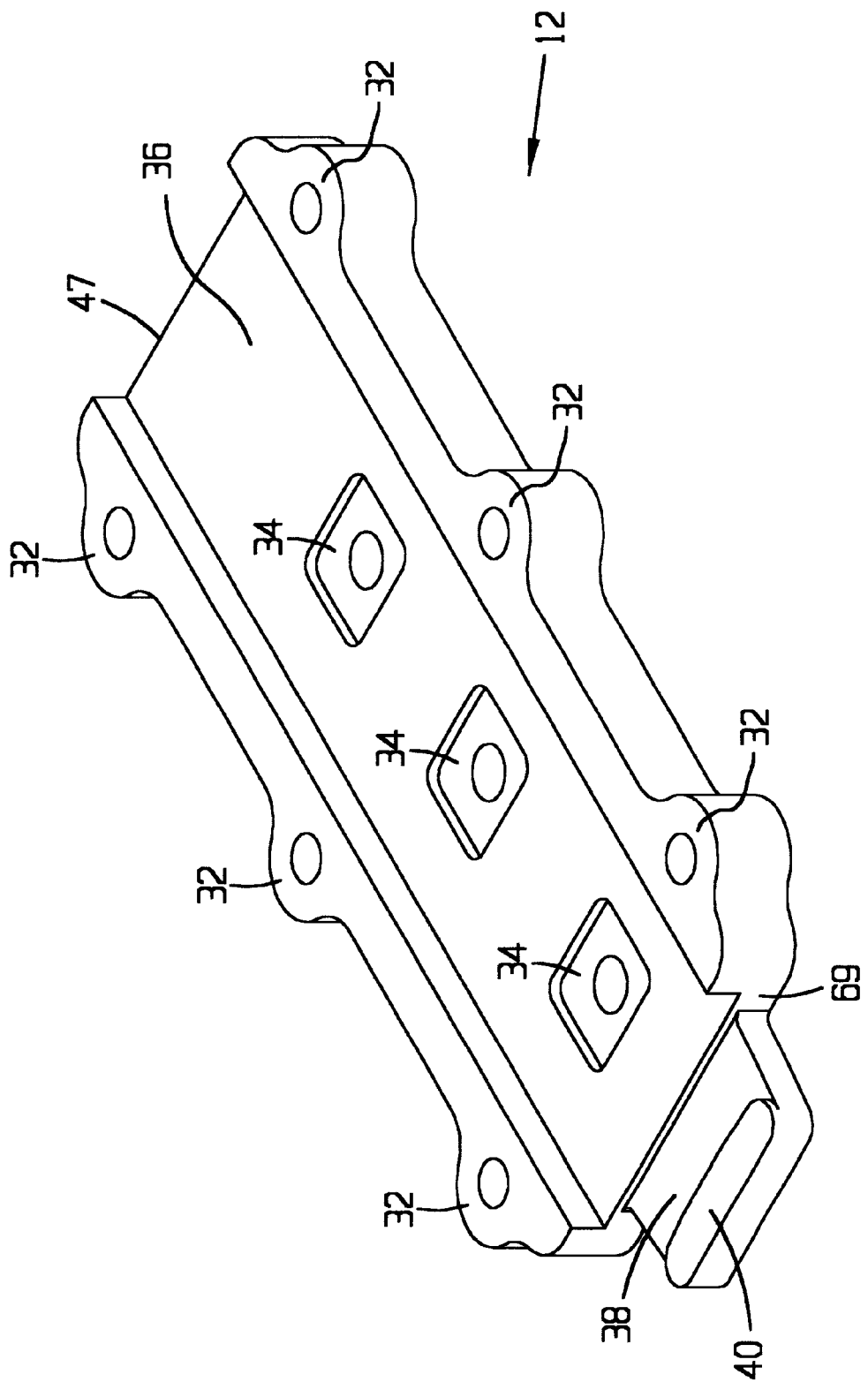
FIG. 4 is perspective view of the clamping portion of an insulative wedge according to the invention.

In FIG. 4 is a perspective view of the clamping portion 12 of an insulative wedge 10 according to the present invention.

The clamping portion 12 exists substantially in the form of a rectangular solid and has a length dimension ("L" in FIG. 6), a width dimension, a thickness dimension, a top surface (54 in FIG. 6), a bottom surface 36, first end portion 69, and a second end portion 47. The bottom surface portion 36 includes at least one depression 34 that is shapely configured complimentary to, and as such is thus adapted to receive at least one of the locator blocks 24 from the base portion 14. The first end portion 69 further includes a tongue portion 38 which protrudes lengthwise from the first end portion, and the tongue portion further comprises a hook means 40 which is configured to connectively engage the engaging well 30 on the base portion 14 when the clamping portion 12 is connectively affixed to the base portion 14 using fasteners, such as 101 from FIG. 1. Although FIG. 1 only shows a single nut and bolt 101 in the bosses, the present invention intends for all bosses capable of receiving fastening means to be so fitted. While the clamping portion 12 and base portion 14 may be connected to one another using any conventional fastening means, the use of nuts and bolts is preferred. Also shown in FIG. 4 are fastener bosses 32 disposed about the outer perimeter of each of its longest sides. According to a preferred form of the invention, the fastener bosses 22 and 32 are cast-in features of each of the clamping portion 12 and base portion 14, when these elements are, as in a preferred embodiment, single articles of manufacture made by a plastic injection molding process.

Figure 5:
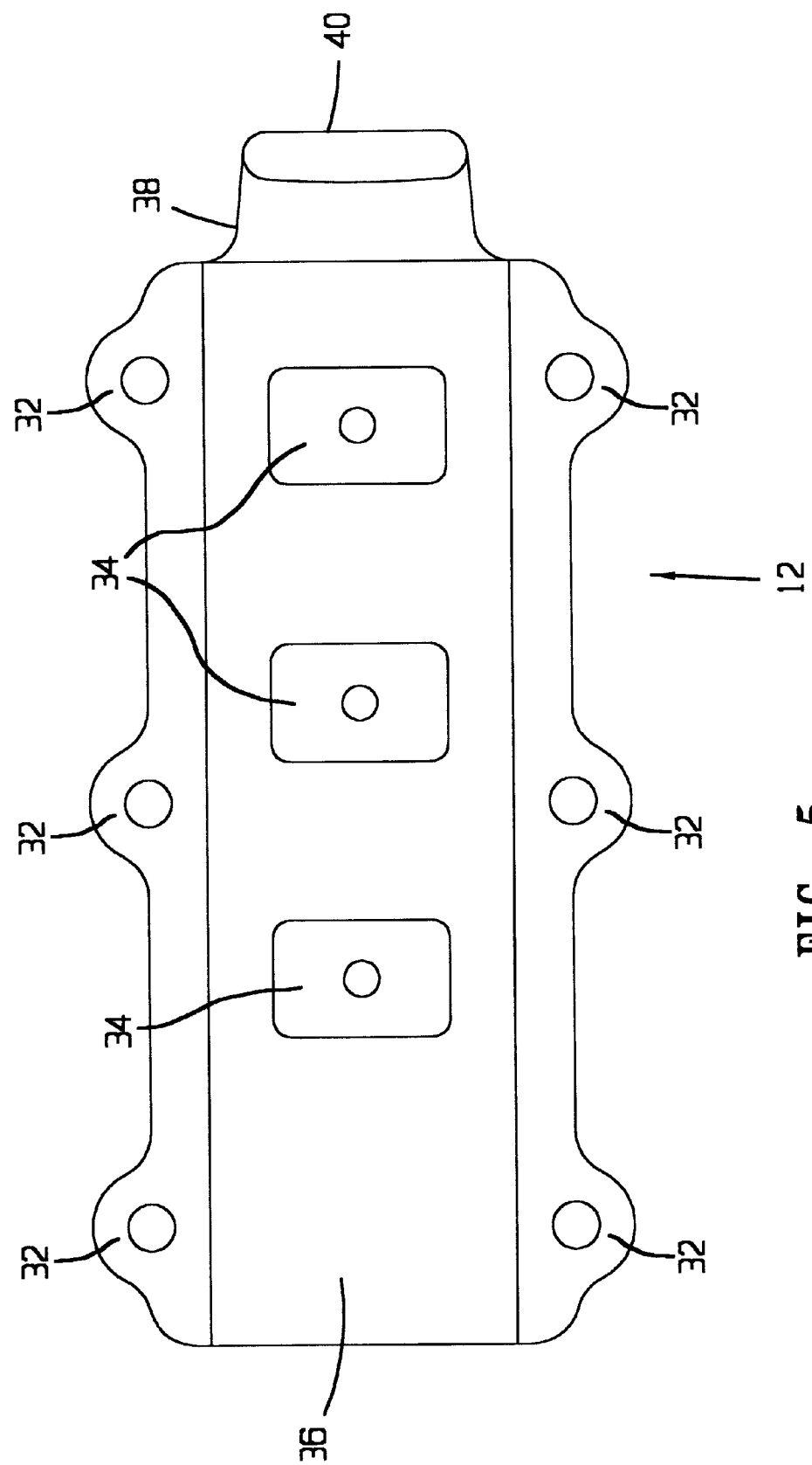
FIG. 5 is an overhead view of the bottom of a clamping portion of an insulative wedge according to the invention.

FIG. 5 is an overhead view of the underside of a clamping portion 12 of an insulative wedge 10 according to the invention showing the bottom surface 36 having depressions 34 in its surface. Also shown are fastener bosses 32 disposed about the outer perimeter of each of its longest sides. The tongue portion 38 and its hook means 40 is also shown.

Figure 6:
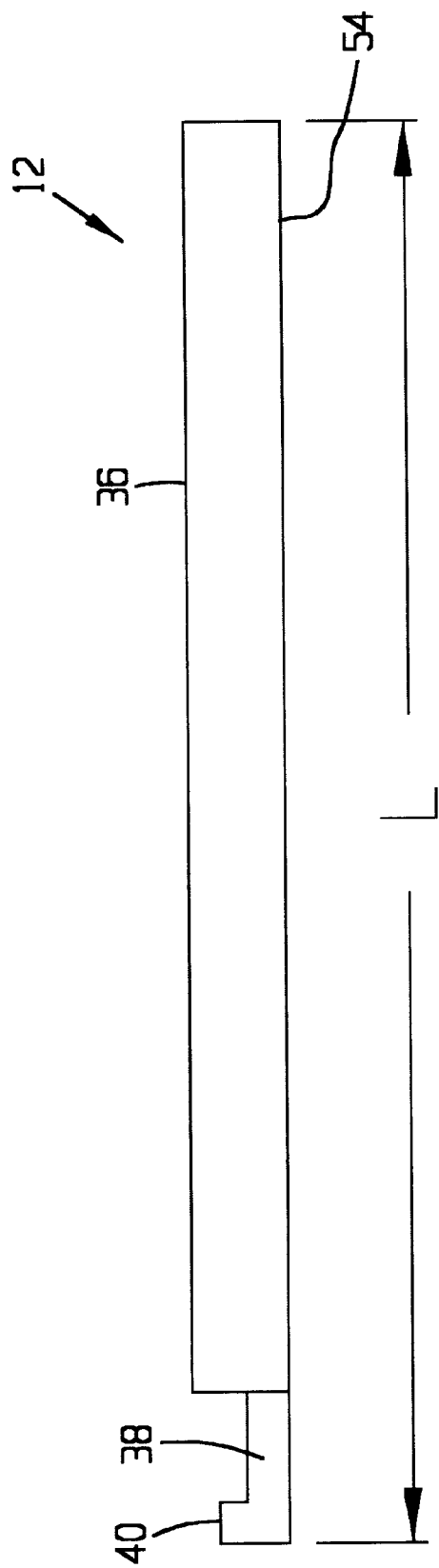
FIG. 6 is a side elevational view of the clamping portion of an insulative wedge according to the invention.

FIG. 6 is a side perspective view of a clamping means 12 of the invention, having top surface 54, bottom surface 36, tongue portion 38 and hook portion 40. Preferably, the tongue 38 and hook means 40 are cast-in features of each of the clamping portion 12 when these elements are, as in a preferred embodiment, single articles of manufacture made by a plastic injection molding process.

Figure 7A:
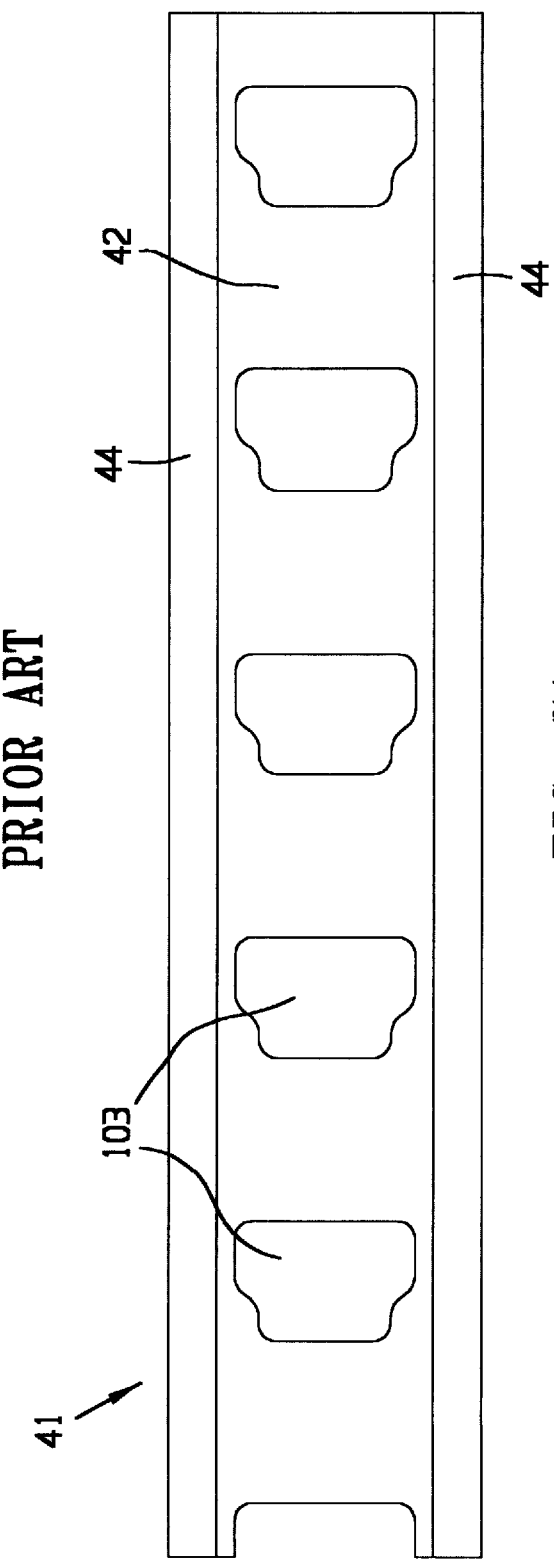
FIG. 7a shows an overhead view of a length section of a prior art linear metallic ware which is suitable to be supported in an insulative wedge according to the invention.
Figure 7B:
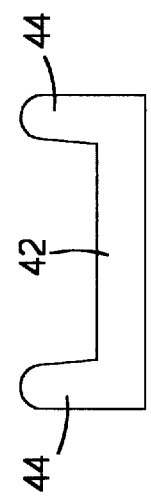
FIG. 7b shows an end view of a length section of a prior art linear metallic ware which is suitable to be supported in an insulative wedge according to the invention.

FIG. 7a shows a linear metallic ware according to the prior art, which is an extruded stock having a flat portion 42 and two side rails 44, as more clearly shown in FIG. 7b which is a cross-sectional view of the metallic ware of FIG. 7a. There are voids 103 disposed along the length of the extruded stock at regularly spaced intervals so as to render the stock to take on an appearance somewhat reminiscent of a ladder. Such stock is commonly used in creating cable racks by workmen.

Figure 8:
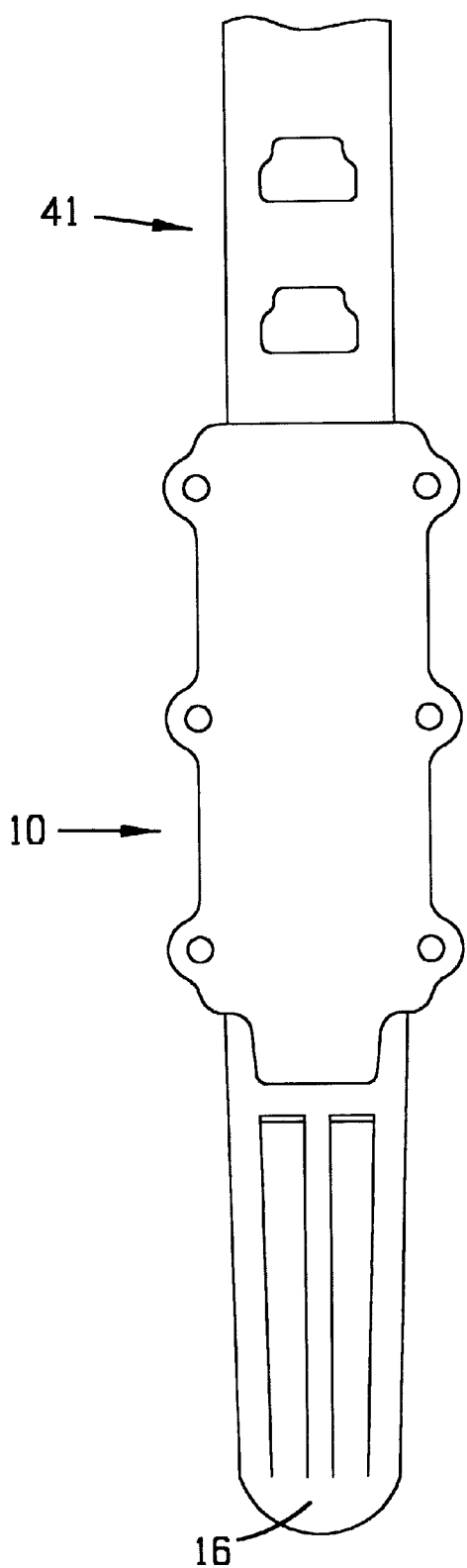
FIG. 8 shows a length section of a prior art linear metallic ware which is supported in an insulative wedge according to the invention

FIG. 8 shows a linear metallic ware, such as that shown in FIGS. 7a and 7b clampedly disposed in the space defined as in-between the bottom surface portion of the clamping portion and the planar ledge of the base portion. This configuration is arrived at by placing the linear metallic ware into the base portion so that the rails 44 of the linear metallic ware reside in the channels 28 of the base portion 14, with the voids 103 being disposed about the locator blocks 24, for added stability. Next, the clamping portion 12 is placed into position over the linear metallic ware so that the hook means 40 engages in the engaging well 30, so as to provide a configuration as shown in FIG. 1 with the linear metallic ware disposed in the location of the hole O. Then, fastening means are disposed commonly in each of the fastening bosses 32 and 22 and tightened to provide the rigid construct such as that in FIG. 8.

The construct of FIG. 8 may be driven into the ground without worry that an underground cable or other conduit will be breached owing to the ability of the curved end 16 to be deflect itself away from an underground conduit. In addition, because an insulative wedge according to the invention is constructed from materials which are electrically insulating, there is no contact between the linear metallic ware selected and the ground.

Figure 9:
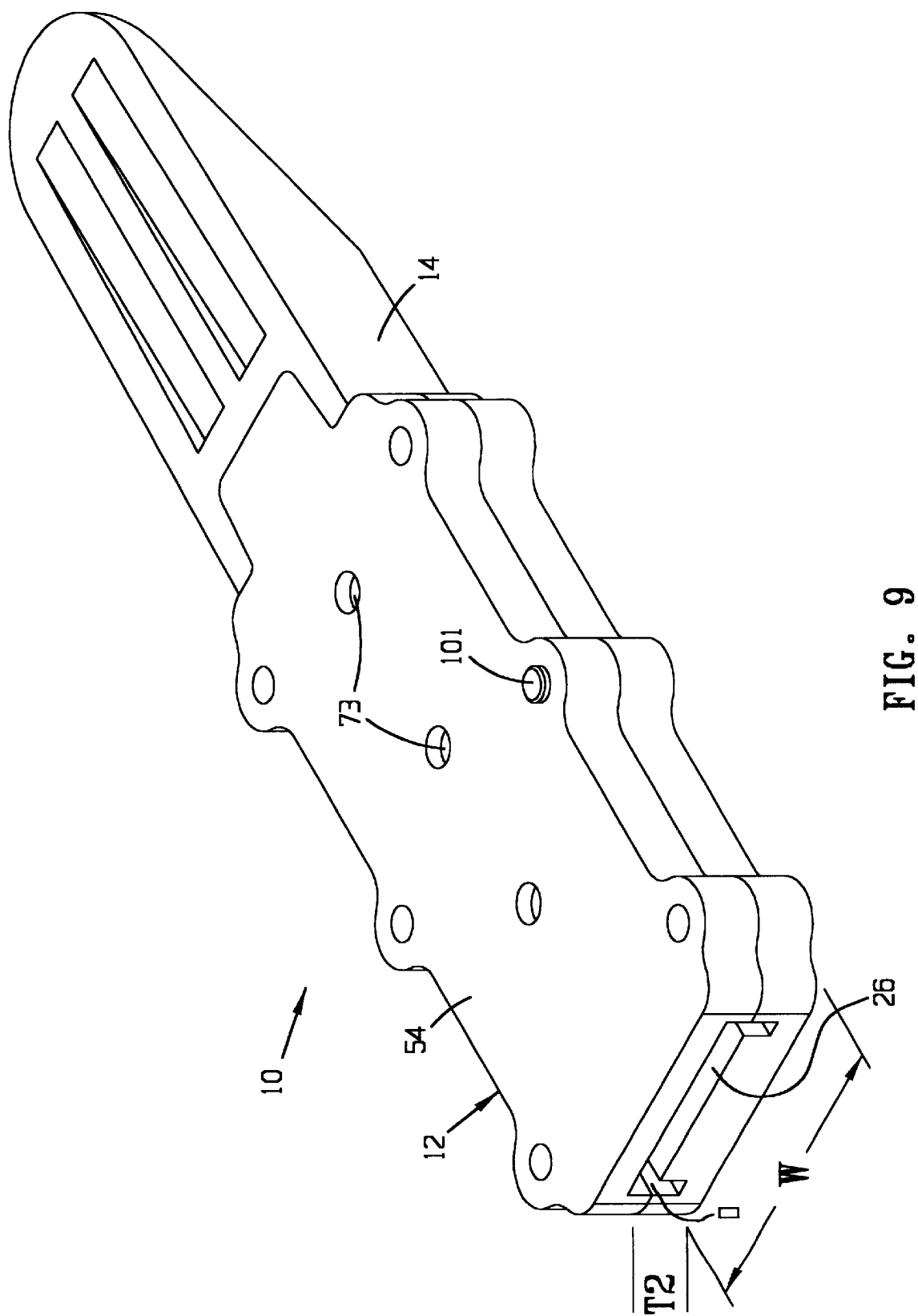
FIG. 9 is a perspective view of an assembled insulative wedge according to an alternate form of the invention.
Figure 10:
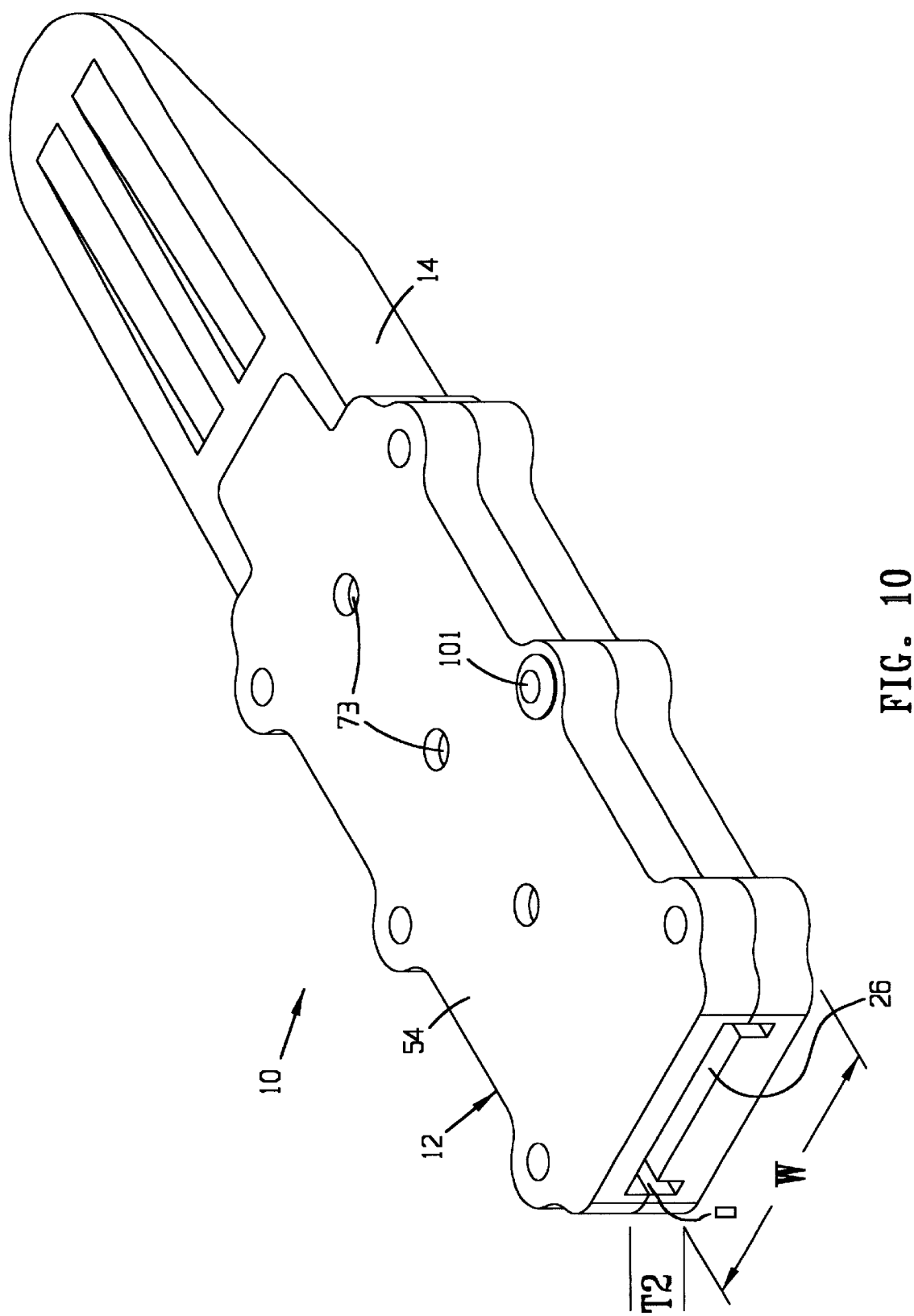
FIG. 10 is a perspective view of an assembled insulative wedge according to an alternate form of the invention.
Figure 11:
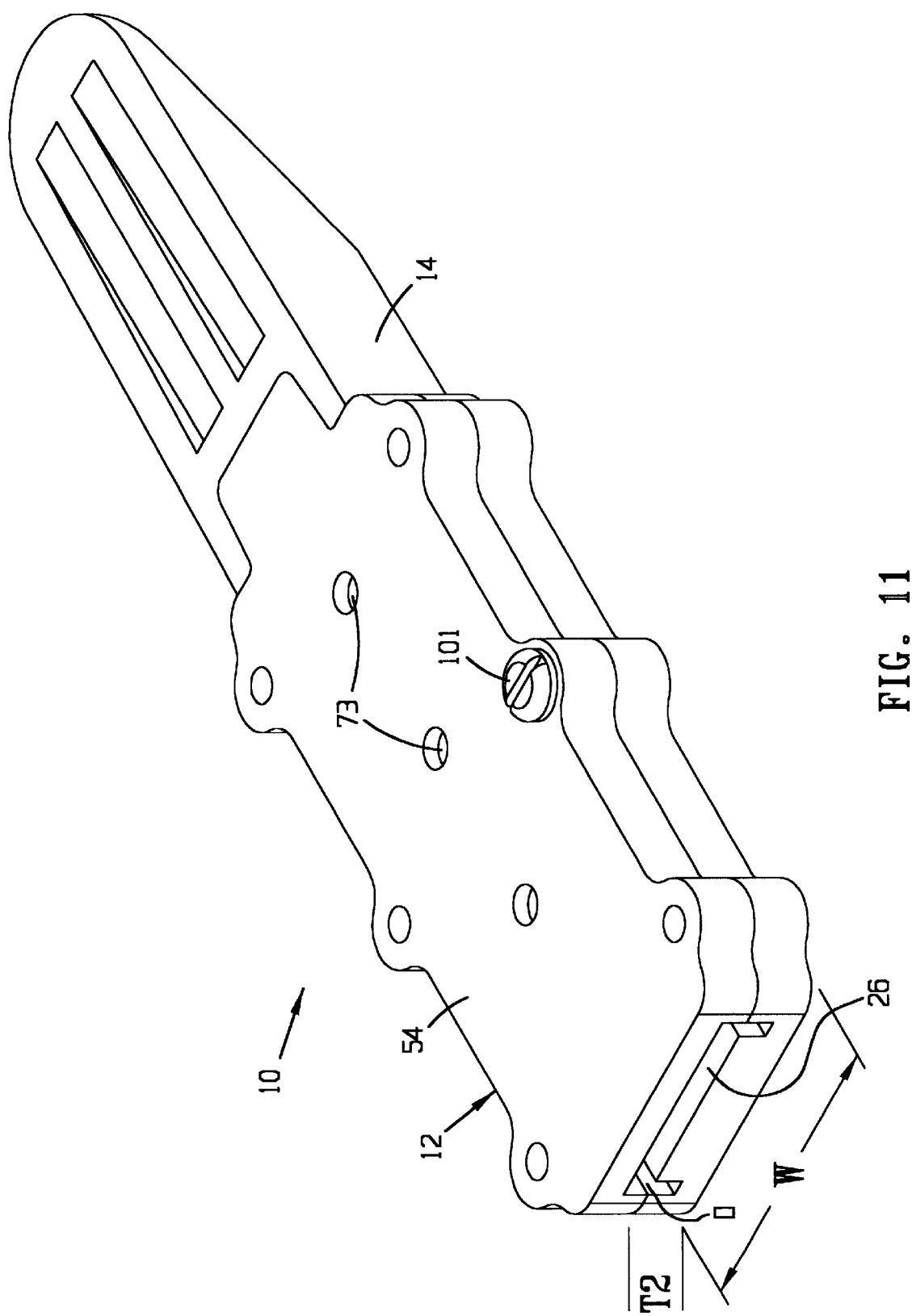
FIG. 11 is a perspective view.of an assembled insulative wedge according to the invention.

FIGS. 9, 10, and 11 depict alternate embodiments of the invention when the fasteners employed are dowel pins, rivets, and screws.

A device according to the present invention is suitable for attachment to the ends of a variety of linear metallic wares, including bars having a cross-section selected from the group consisting of: round, oval, square, rectangular, triangular, pentagonal and hexagonal. In addition, a device according to the invention is suitable for attachment to the end of angle iron, or L-shaped beams, and I-beams as well.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. Accordingly, the presently disclosed invention is intended to cover all such modifications and alterations, and is limited only by the scope of the claims which follow.

What is claimed is:

1. An insulative wedge for attachment to the ends of linear metallic wares comprising:

a) a base portion, wherein said base portion exists substantially in the shape of a rectangular solid, and has a length dimension, a width dimension, a thickness dimension, a top surface, a bottom surface, a first end portion, and a second end portion, wherein said top surface and said bottom surface taper towards one another in an intersecting orientation directed towards said first end portion, and wherein said second end portion of said base portion comprises a planar ledge of substantially rectangular dimensions having longest and shortest sides, wherein the length dimension of the planar ledge extends in the same direction as the length dimension of said base portion, and wherein the width dimension of the planar ledge extends in the same direction as the width dimension of said base portion, said planar ledge portion having a thickness dimension which is less than the thickness dimension of said base portion, said planar ledge comprising at least one locator block disposed thereon, said ledge spanning the entire width dimension of said base portion, and spanning at least 25% of the length dimension of said wedge, wherein said second end portion further comprises a plurality of fastener bosses disposed about the outer perimeter of said planar ledge along each of its longest sides, said base portion further including a locator well in its top surface portion; and b) a clamping portion, wherein said clamping portion exists substantially in the shape of a rectangular solid, and has a length dimension, a width dimension, a thickness dimension, a top surface, a bottom surface, a first end portion, and a second end portion, wherein said bottom surface portion includes at least one depression that is adapted to receive said at least one locator block, wherein said first end portion of said clamping portion includes a tongue portion which protrudes lengthwise from its first end portion, said tongue portion further comprising a hook means which is adapted to connectively engage said locator well on said base portion, and wherein said clamping portion further comprises a plurality of fastener bosses disposed about the outer perimeter of each of its longest sides, and wherein said tongue portion is engaged in said locator well.

2. An insulative wedge according to claim 1 wherein said planar ledge includes at least one linear channel extending in the same direction as the length dimension of said base portion.

3. An insulative wedge according to claim 1 further comprising at least one fastener commonly disposed through one of said fastener bosses on said base portion and one of said fastener bosses on said clamping portion.

4. An insulative wedge according to claim 3 wherein said fastener is selected from the group consisting of: nut and bolt; screw; rivets; and dowel pins.

5. An insulative wedge according to claim 1 wherein the first end portion of said base portion comprises a curved tip.

6. An insulative wedge according to claim 1 wherein the first end portion of said base portion comprises a pointed tip.

7. An insulated construct comprising an insulative wedge according to claim 1 and further comprising the end portion of a linear metallic ware disposed in the space defined as in-between the bottom surface portion of said clamping portion and said planar ledge of said base portion.

8. An insulated construct according to claim 7 further comprising at least one fastener commonly disposed through a fastener boss on said base portion and a fastener boss on said clamping portion.

9. An insulated construct according to claim 8 wherein said fastener is selected from the group consisting of: nut and bolt; screws; rivets; and dowel pins.

10. An insulative wedge combination for attachment to the ends of metallic wares, useful for insulating said metallic wares from contact with the ground, comprising:

a) a base portion comprising an electrical non-conductor material; and b) a clamping portion, wherein said base portion is adapted to receive said clamping portion in a grasping orientation with respect to a metallic ware that is disposed in an interstice between said base portion and said clamping portion, said insulative wedge combination further comprising:

c) a first end portion that is well suited to pierce the ground; and d) a second end portion at which said metallic ware first comes into contact with said combination, said base portion and said clamping portion being attached to one another by means of one or more fasteners selected from the group consisting of: nut and bolt; screws; rivets; and dowel pins.

11. An insulative wedge combination according to claim 10 wherein the first end portion of said base portion comprises a curved tip.

12. An insulative wedge combination according to claim 10 wherein the first end portion of said base portion comprises a pointed tip.

13. An insulated construct comprising an insulative wedge according to claim 10 and further comprising the end portion of a linear metallic ware disposed in said interstice between said base portion and said clamping portion.

14. An insulated construct according to claim 13 wherein said metallic ware is a linear metallic ware.

15. An insulated construct according to claim 14 wherein said metallic ware is a cable rack.

* * * * *